Figure 12:
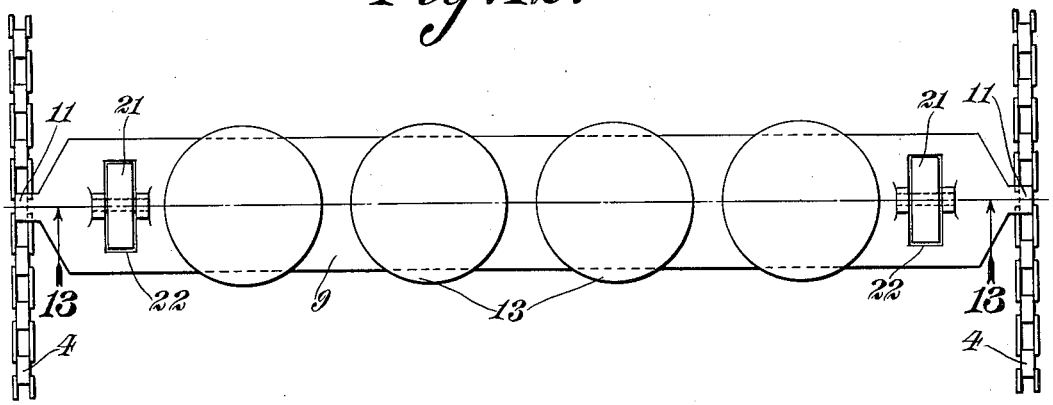

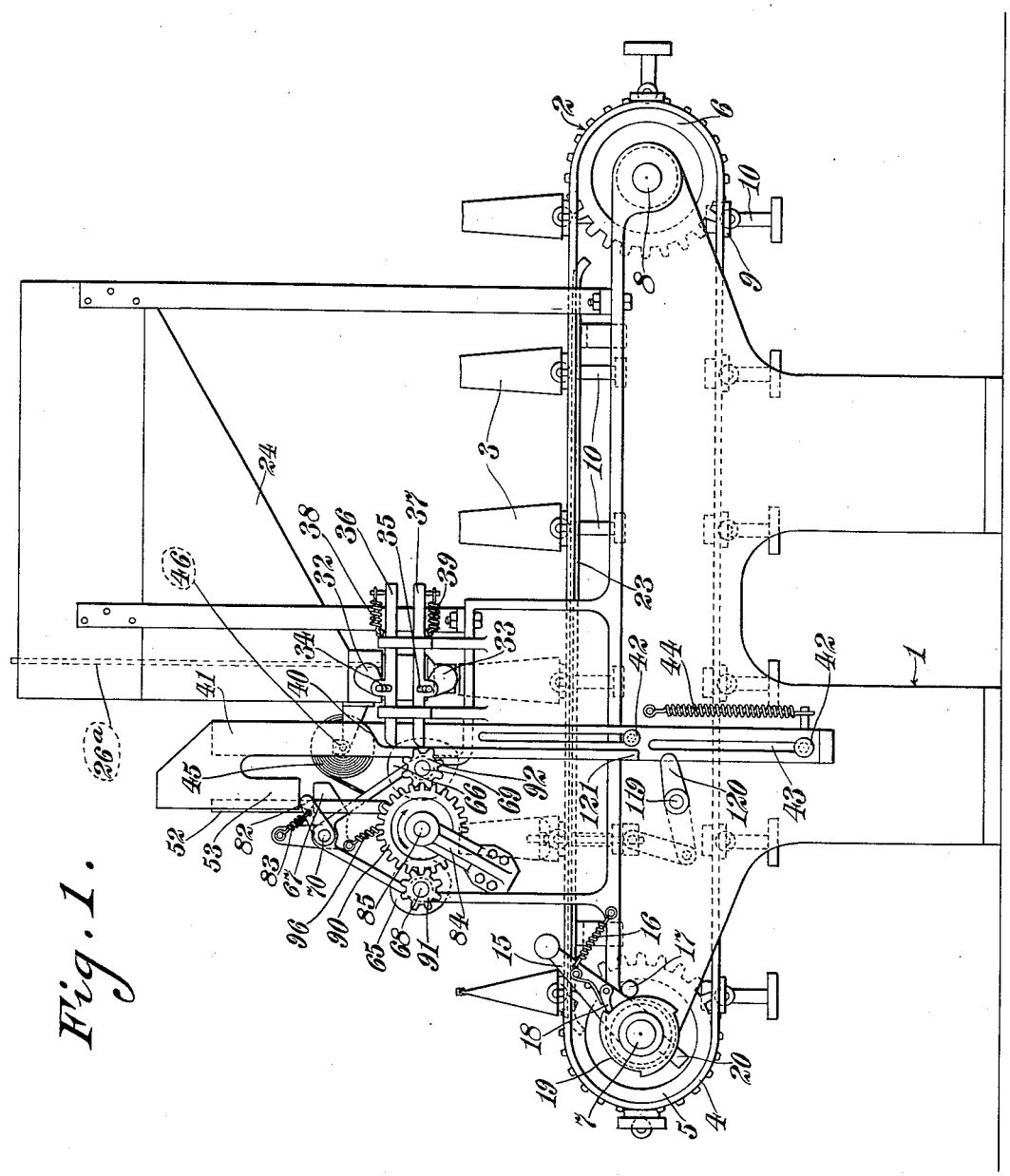

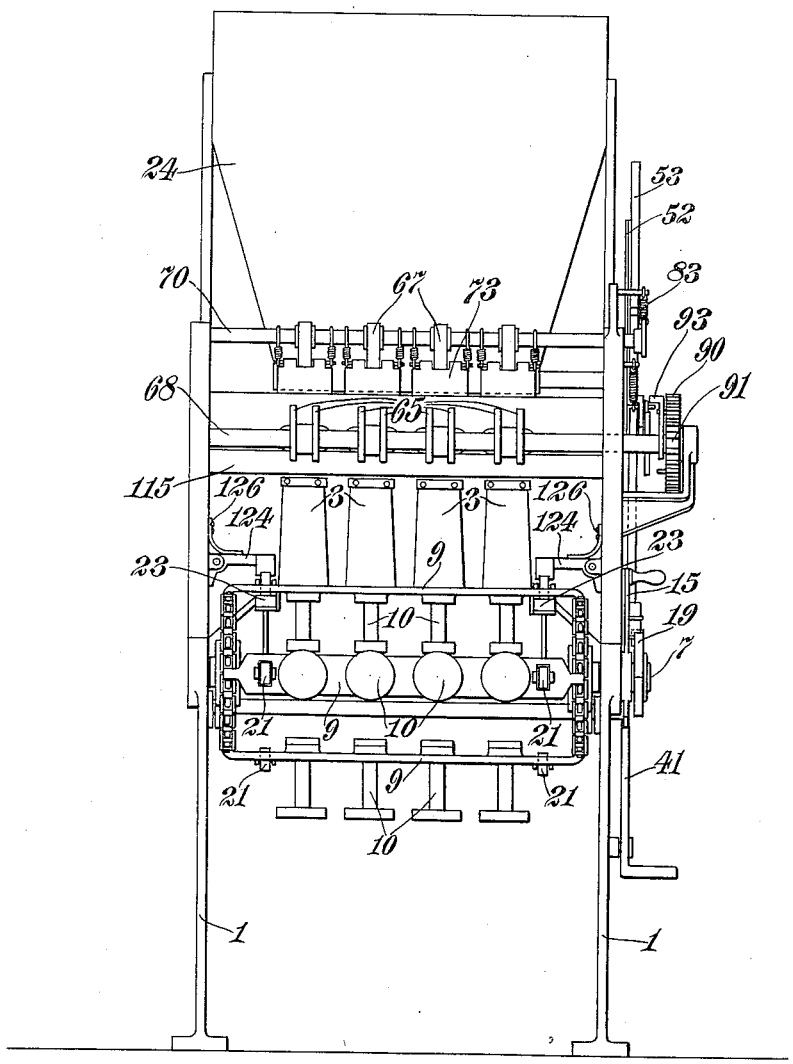

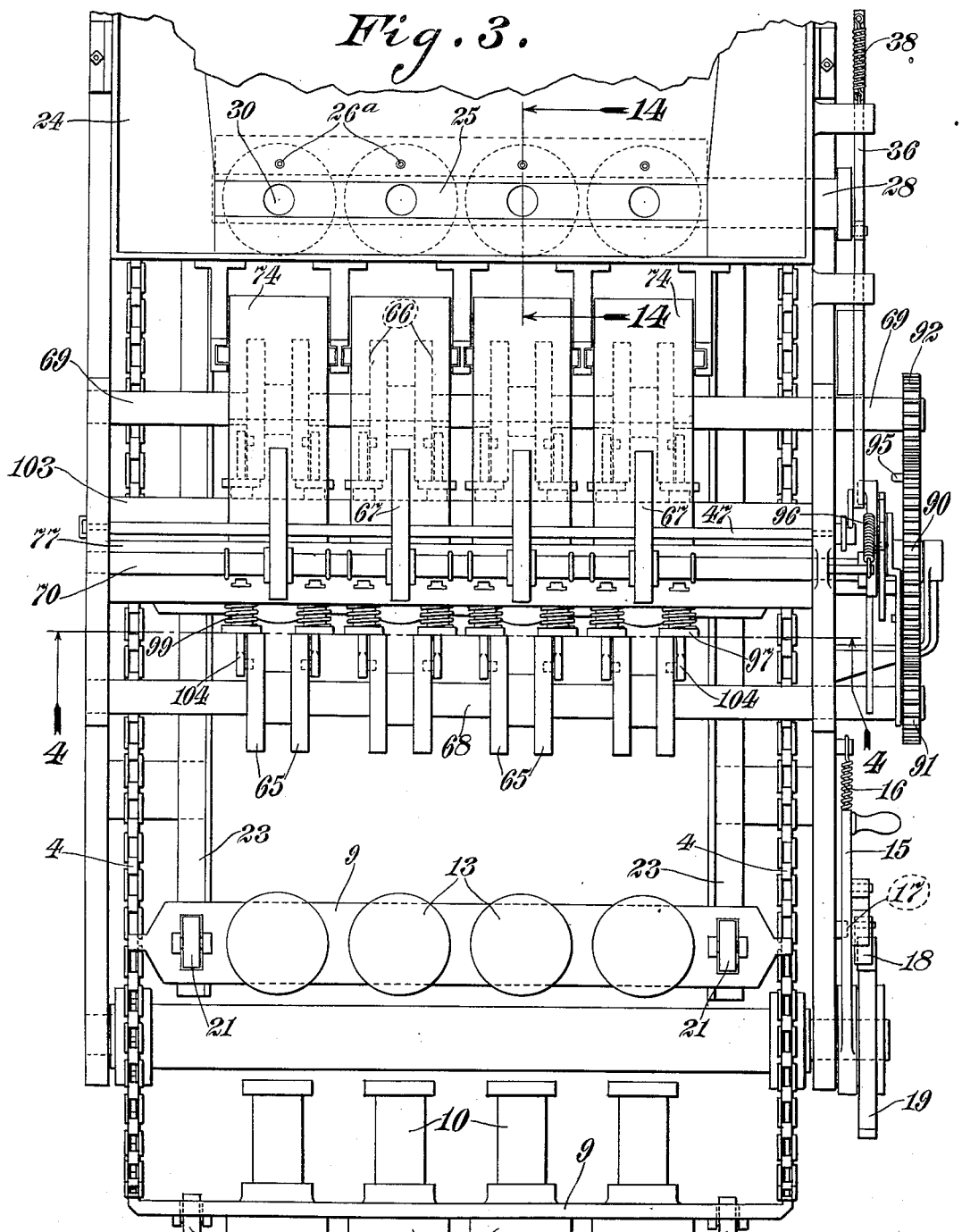

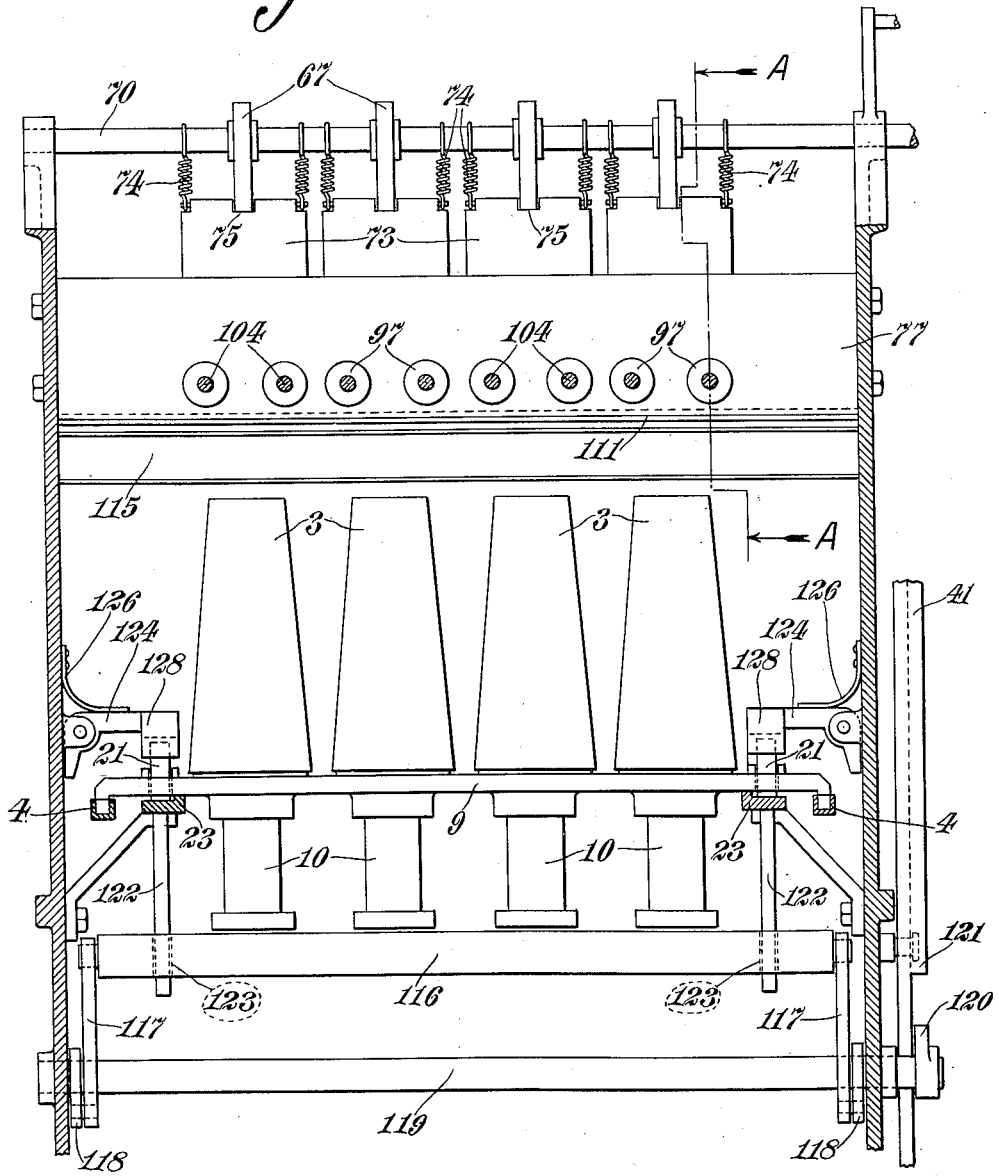

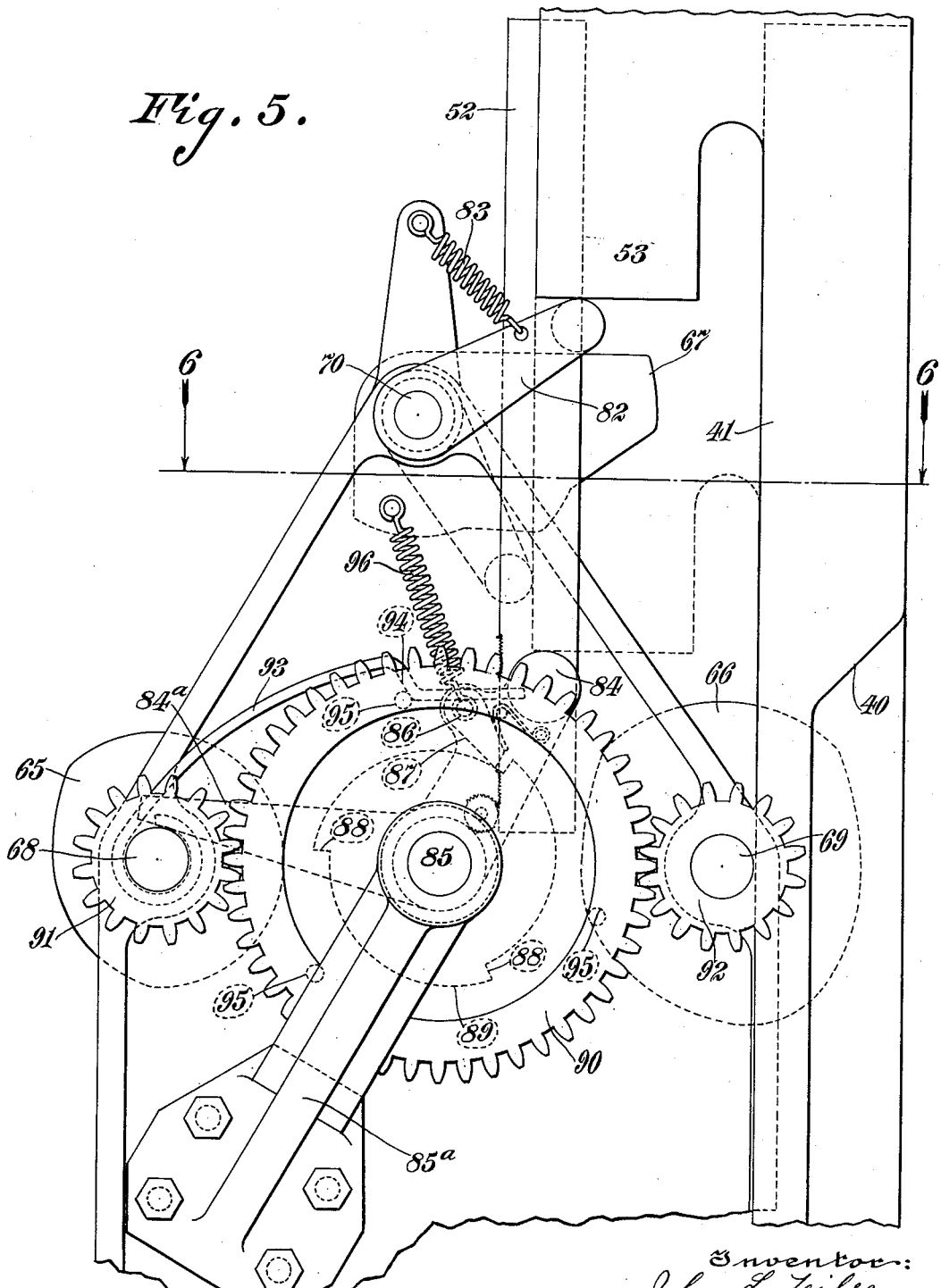

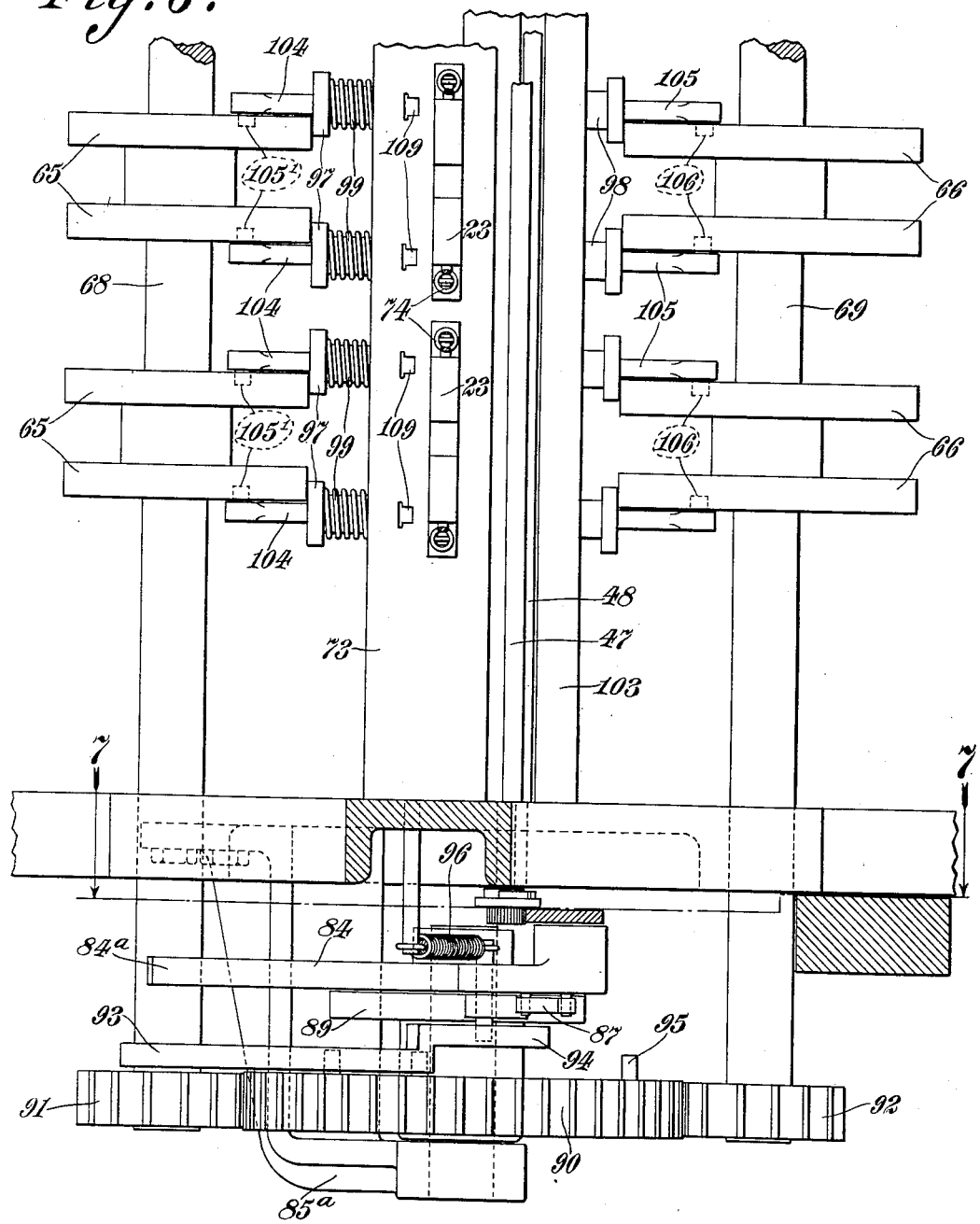

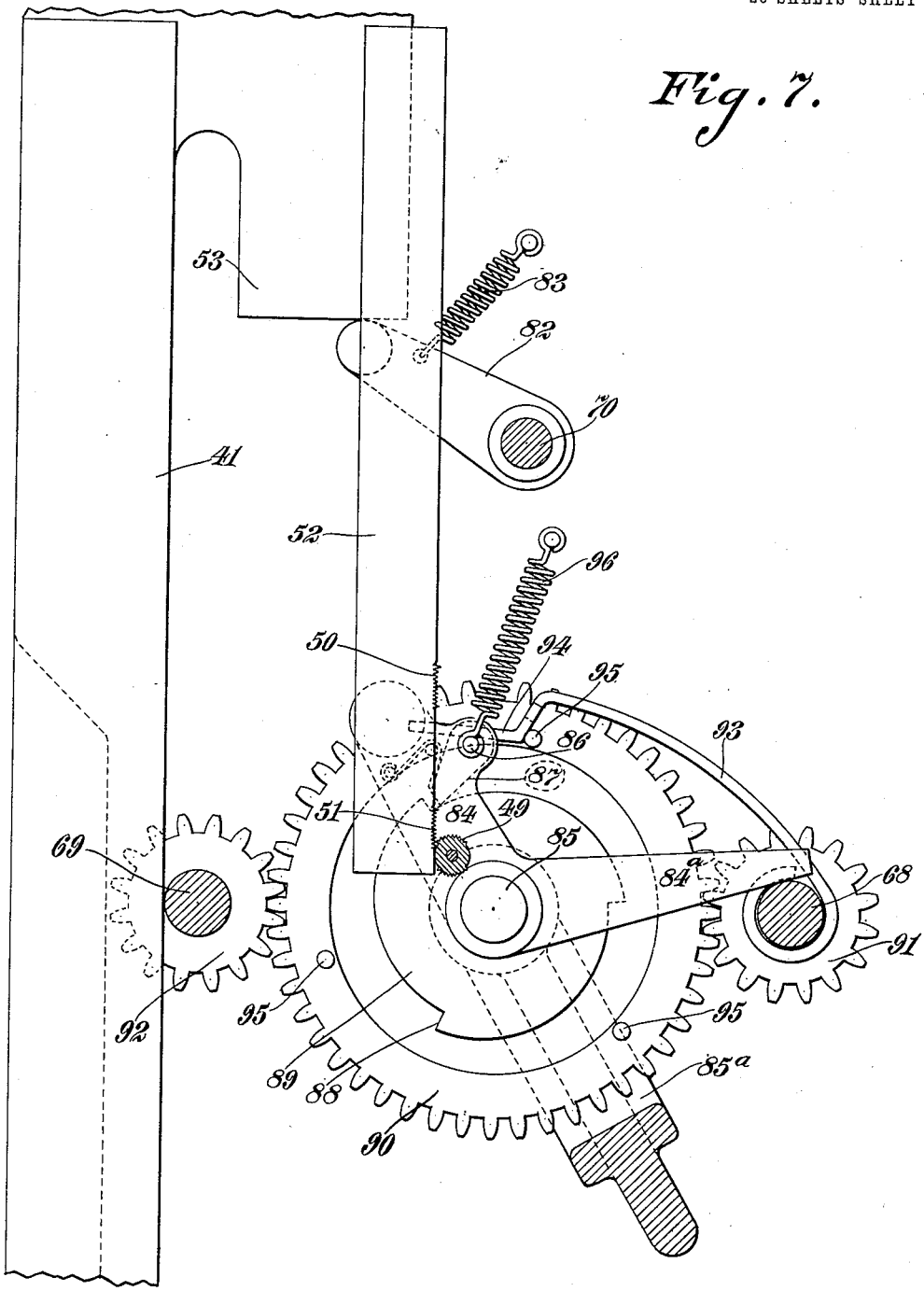

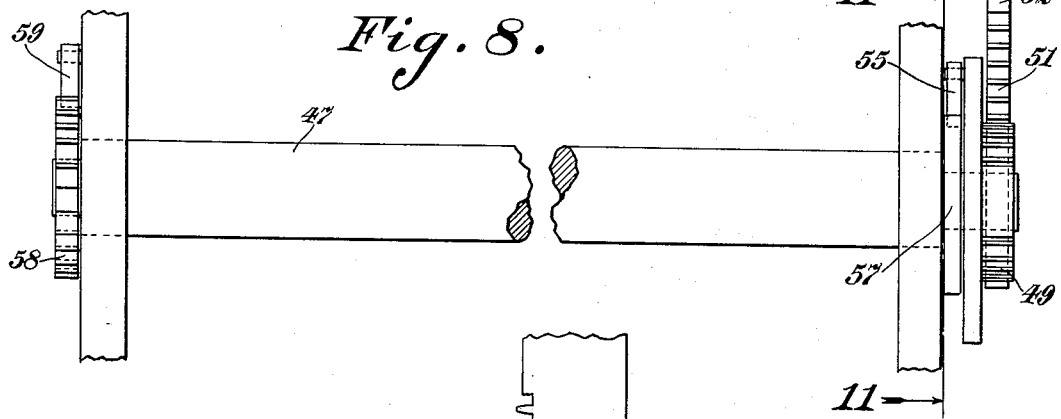
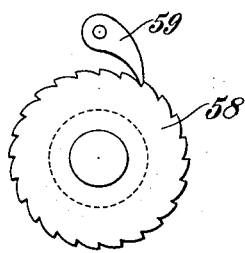
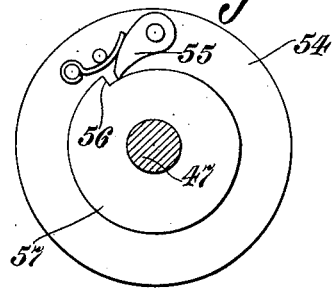
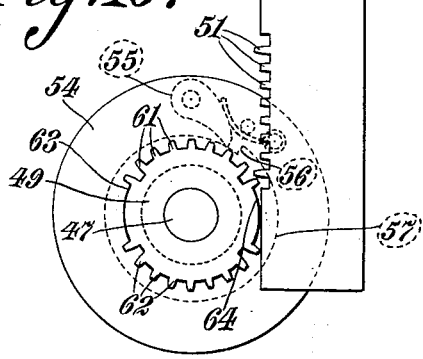
J. L. ZEILER.
APPARATUS FOR FILLING AND CLOSING BOTTLES.
APPLICATION FILED OCT. 26, 1912.
1,070,222. Patented Aug. 12, 1913.
20 SHEETS—SHEET 8.

J. L. ZEILER.
APPARATUS FOR FILLING AND CLOSING BOTTLES.
APPLICATION FILED OCT. 26, 1912.

1,070,222.

Patented Aug. 12, 1913.
20 SHEETS—SHEET 9.

J. L. ZEILER.
APPARATUS FOR FILLING AND CLOSING BOTTLES.
APPLICATION FILED OCT. 26, 1912.
1,070,222.
Patented Aug. 12, 1913.
20 SHEETS—SHEET 10.
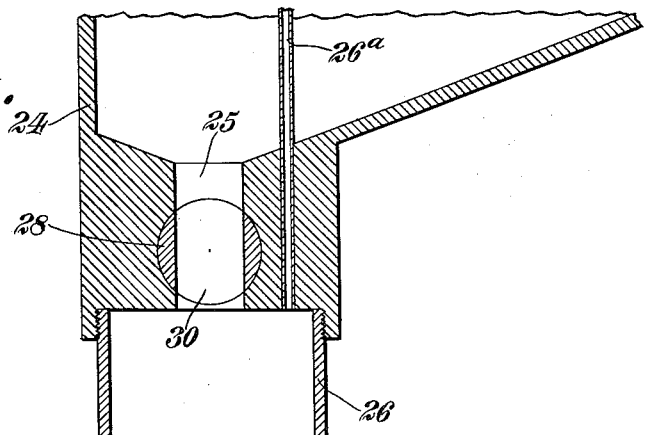
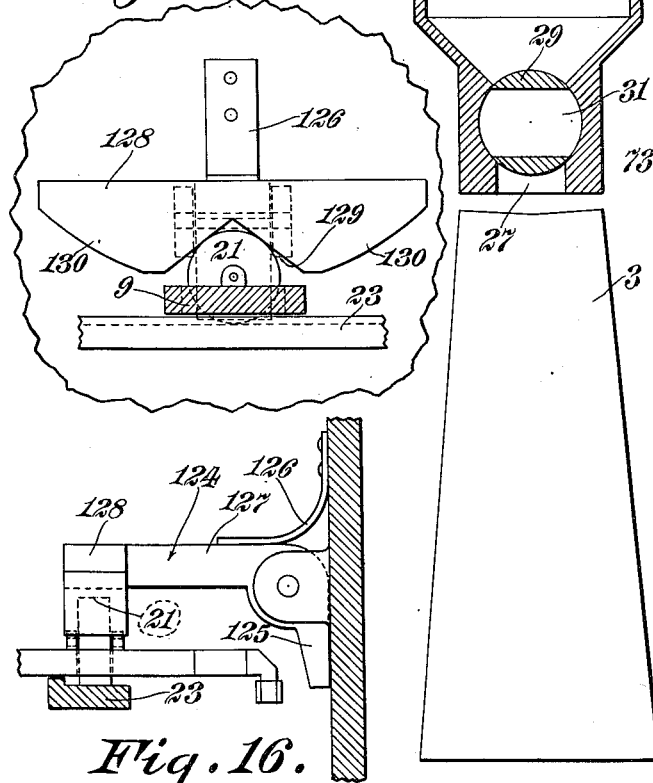
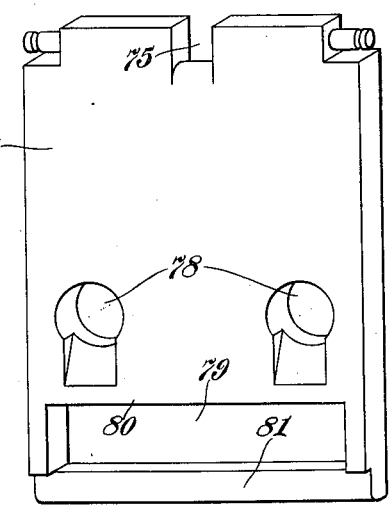

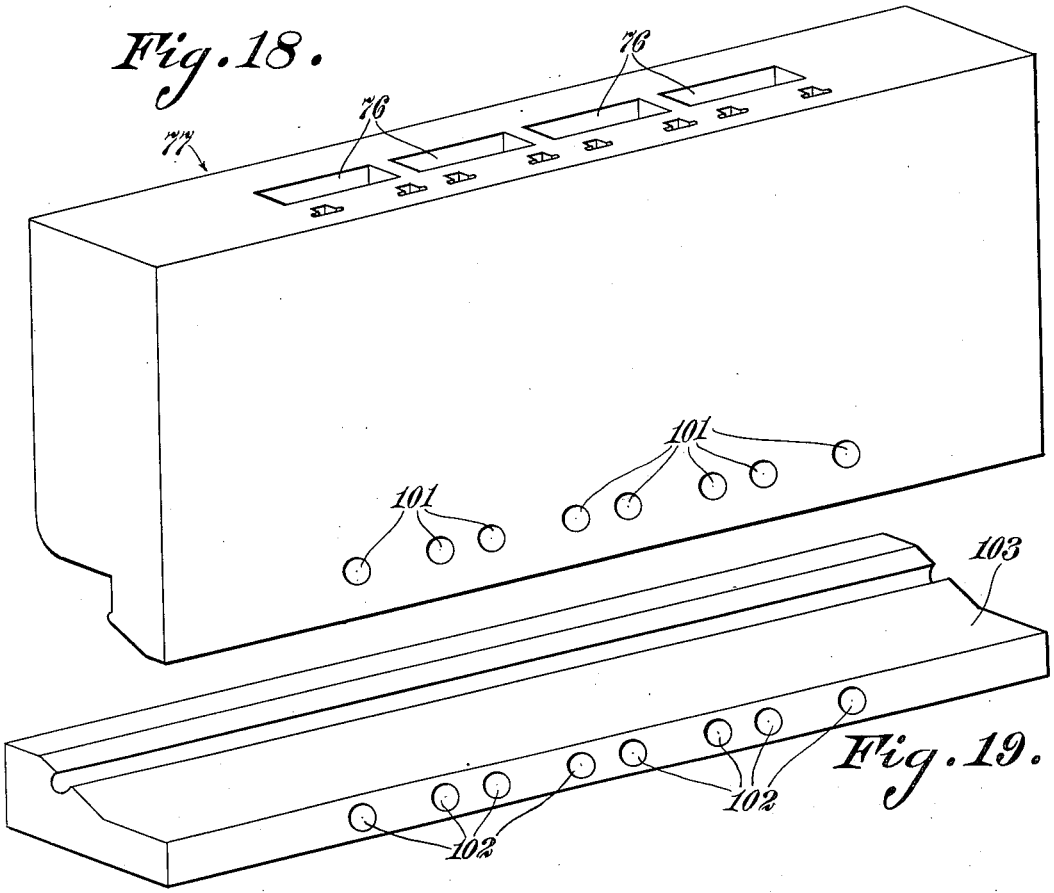

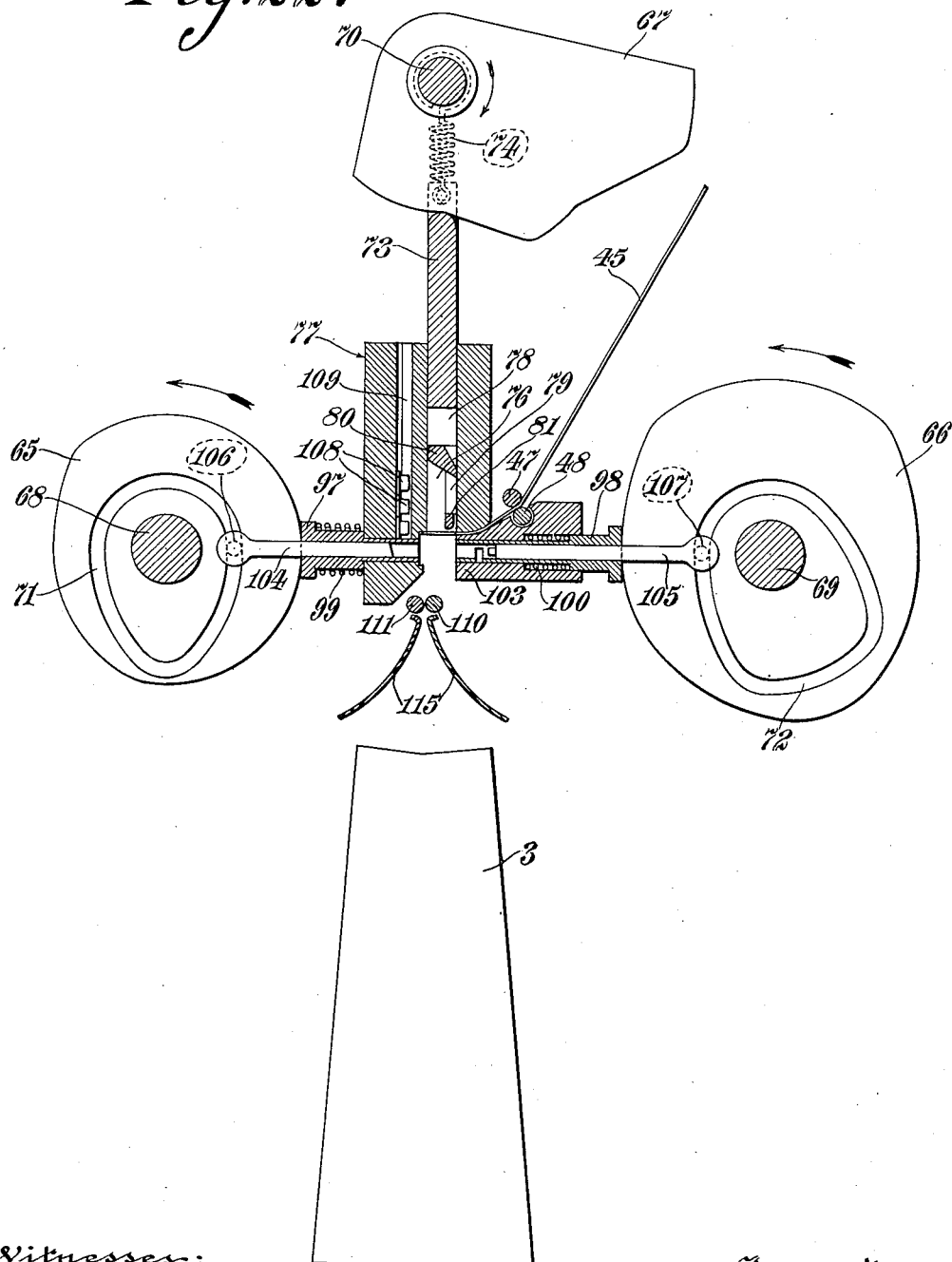

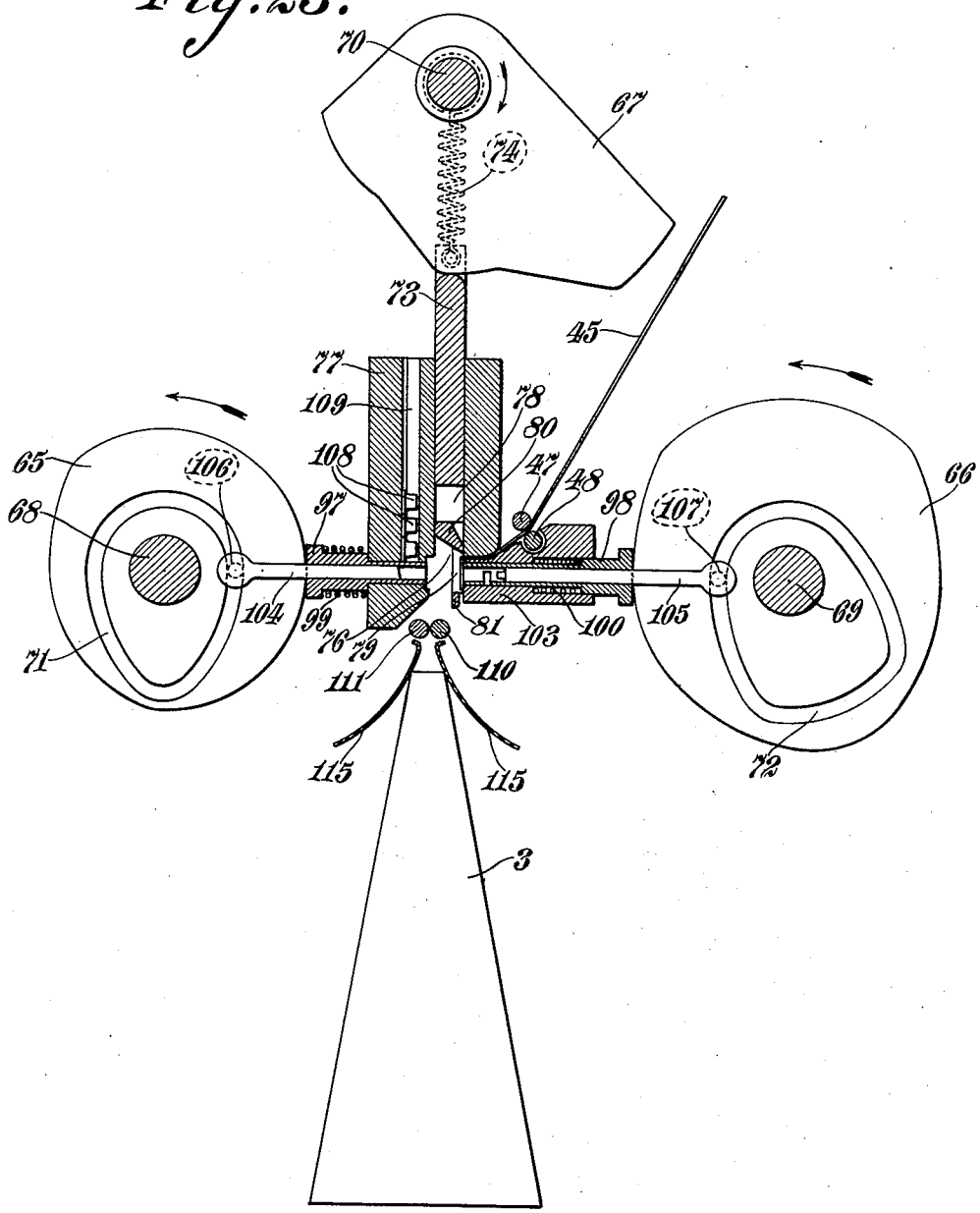

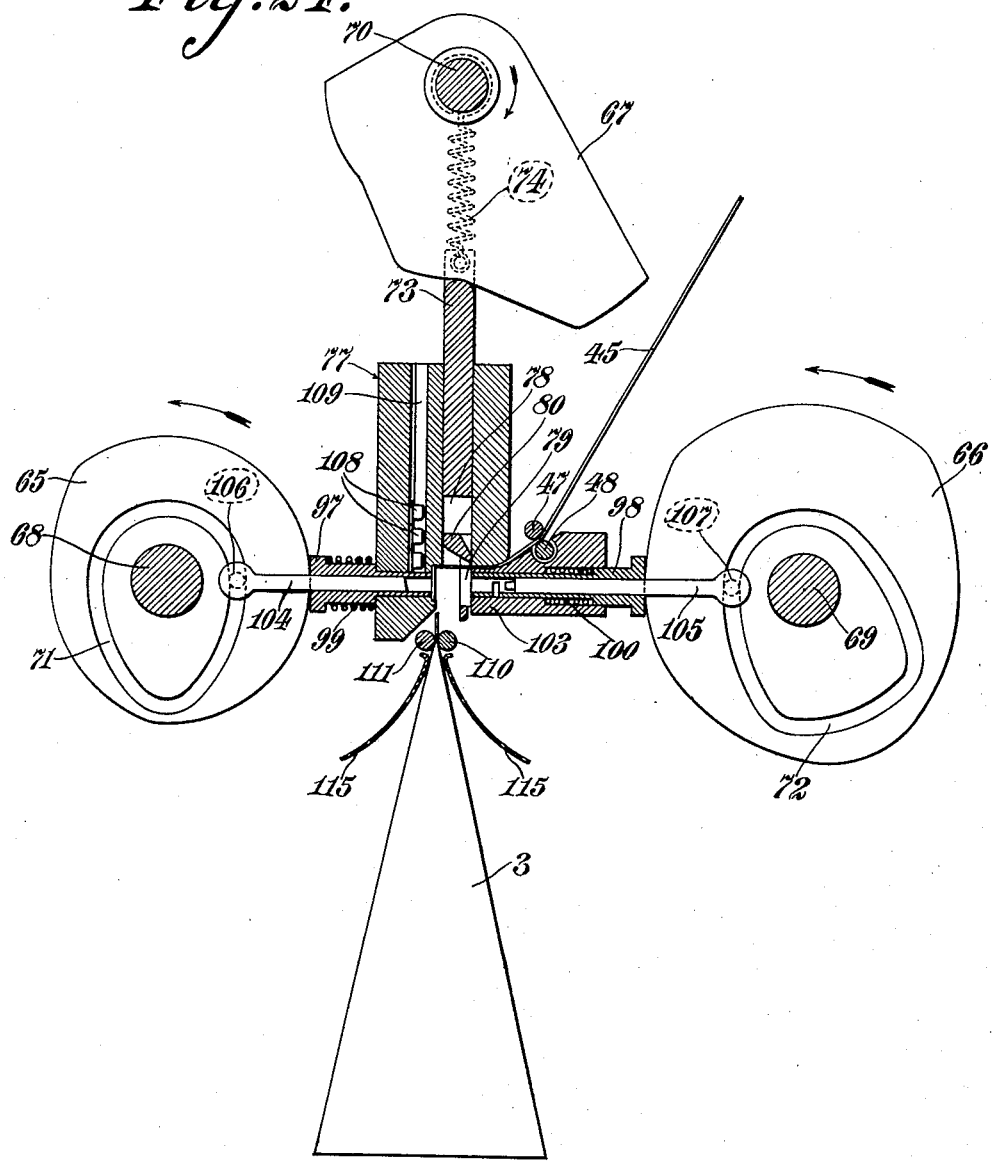

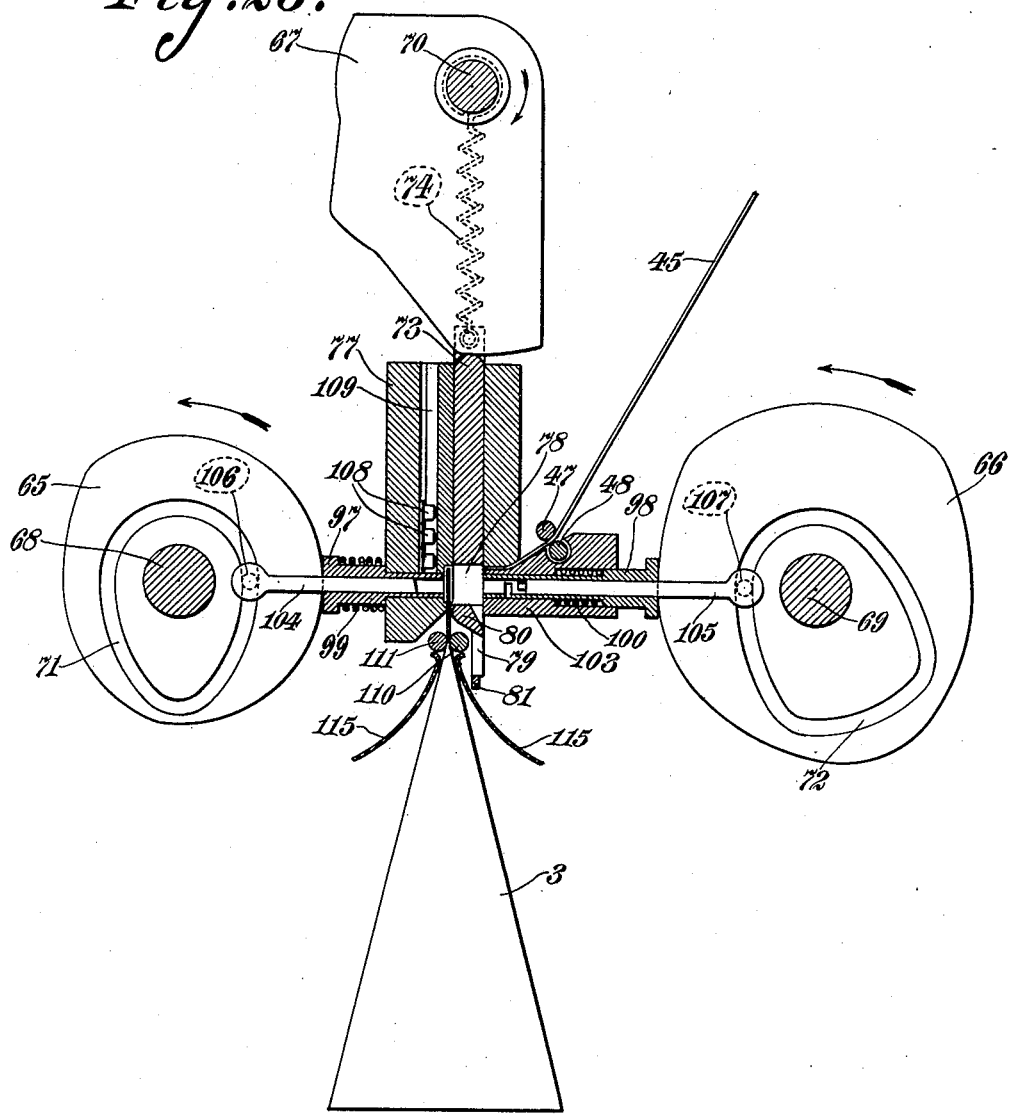

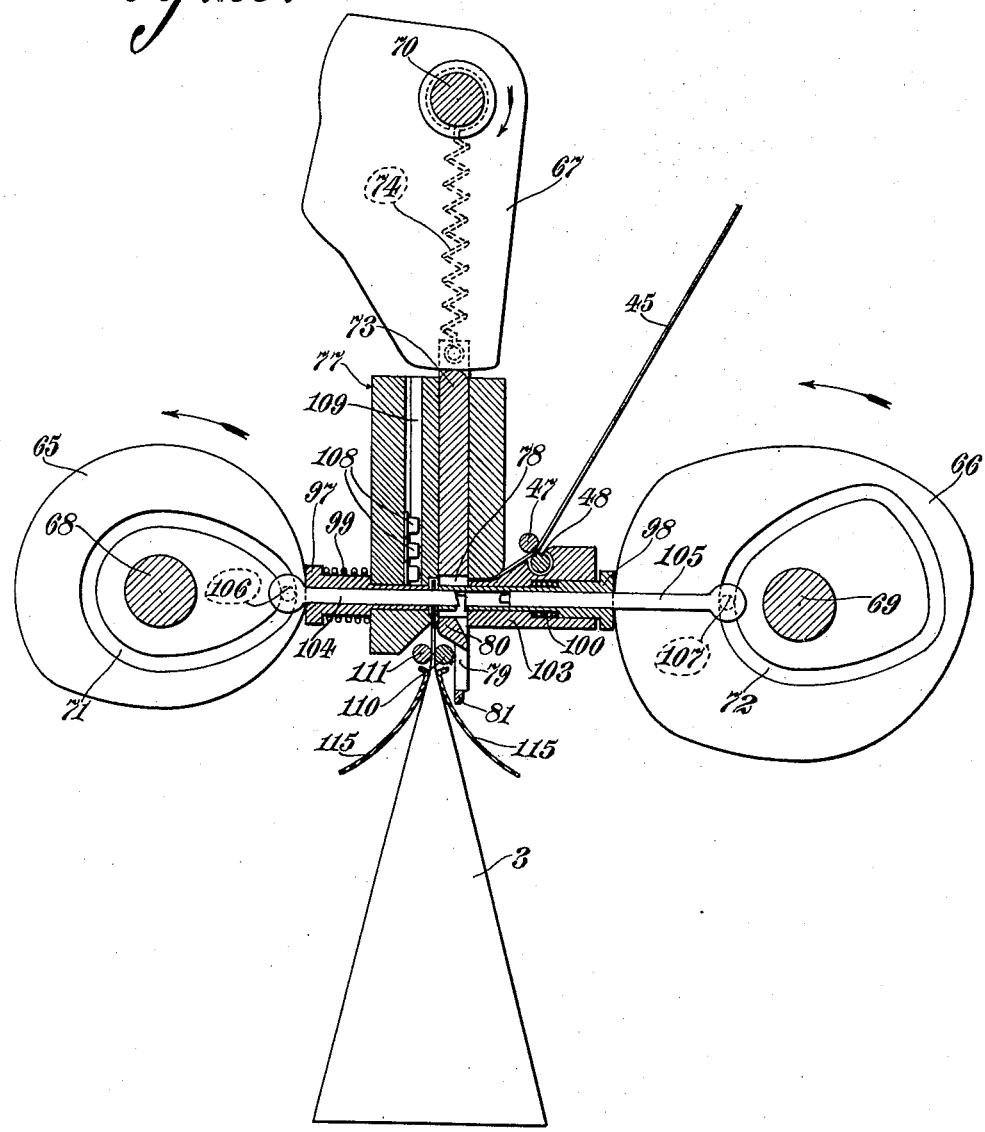

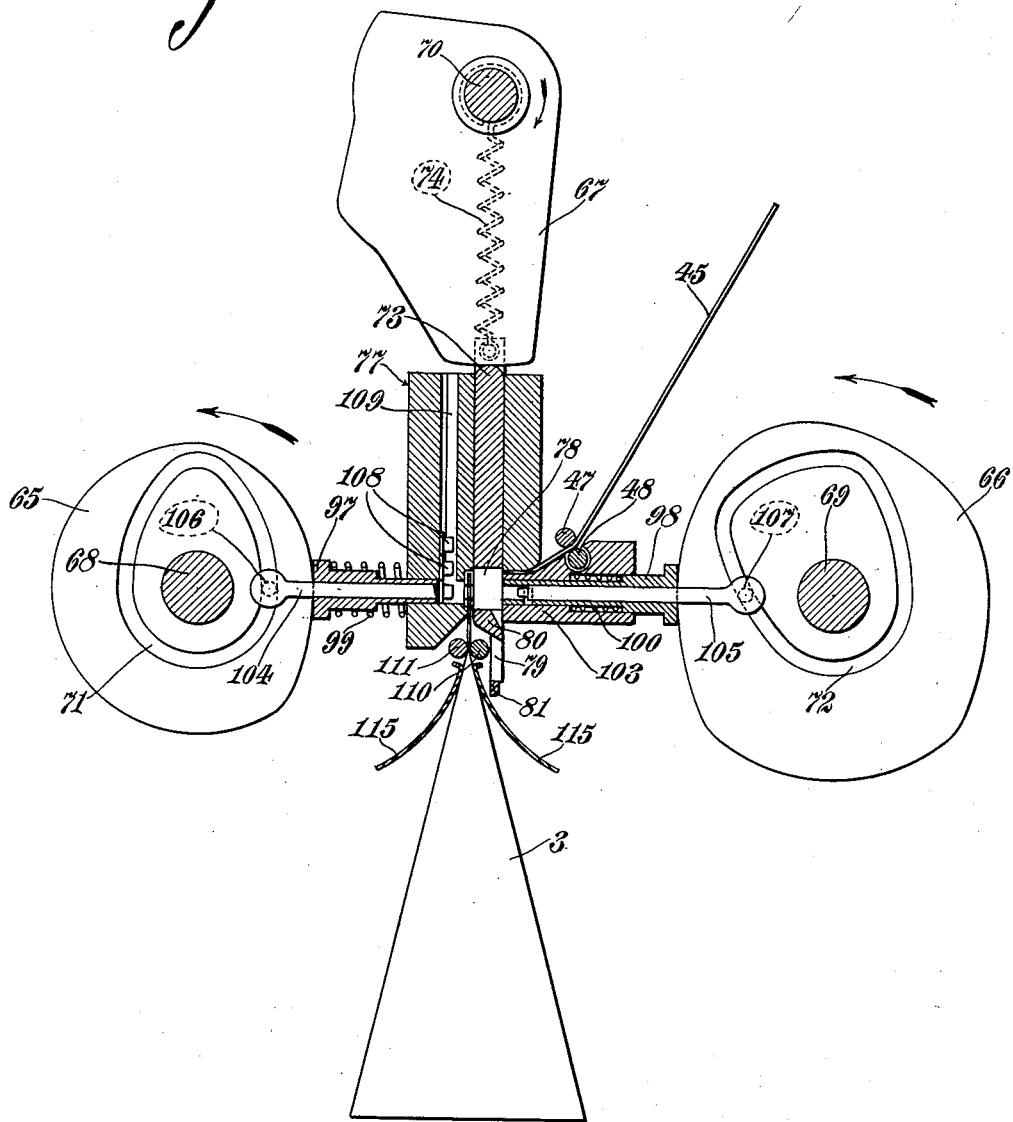

J. L. ZEILER.
APPARATUS FOR FILLING AND CLOSING BOTTLES.
APPLICATION FILED OCT. 26, 1912.

1,070,222.

Patented Aug. 12, 1913.
20 SHEETS—SHEET 18.

J. L. ZEILER.
APPARATUS FOR FILLING AND CLOSING BOTTLES.
APPLICATION FILED OCT. 26, 1912.

1,070,222. Patented Aug. 12, 1913.
20 SHEETS—SHEET 20.

Witnesses:
Harry H. Peiss.
George G. Anderson.

Inventor:
John L. Zeiler,
By Hugh K. Wagner
His Attorney.

UNITED STATES PATENT OFFICE.

JOHN L. ZEILER, OF OROSI, CALIFORNIA.

APPARATUS FOR FILLING AND CLOSING BOTTLES.

1,070,222. Specification of Letters Patent. Patented Aug. 12, 1913.

Original application filed August 21, 1911, Serial No. 645,207. Divided and this application filed October 26, 1912. Serial No. 727,889.

*To all whom it may concern:*

Be it known that I, JOHN L. ZEILER, a citizen of the United States, formerly residing at the city of Clayton, in the county of St. Louis and State of Missouri, but now residing at Orosi, in the county of Tulare, State of California, have invented certain new and useful Improvements in Apparatus for Filling and Closing Bottles, of which the following is a specification.

This application is a division and a continuation of one filed by me August 21, 1911, Serial No. 645,207, for apparatus for closing and sealing bottle tops.

This invention has reference to apparatus for filling and closing bottles, and is designed primarily for operating upon or in conjunction with that type of bottle which is constructed of paper or similar sheet material and is especially intended for holding milk and other liquids of like character.

At the present time, milk is generally bottled in glass bottles, which, however, are most objectionable by reason of the fact that their weight renders them cumbersome to handle and to haul to and from the dairy. Such bottles, furthermore, are apt to become inverted, fall upon their sides, and even become broken during transit from the dairy, in which instance their contents are usually wholly or partially lost by spilling or leakage. The empty bottles must be collected along a route at the same time that filled bottles are delivered, and must be thoroughly washed and sterilized before being refilled in order to prevent the spreading of zymotic and other diseases, a proceeding which, obviously, entails an extra expense to the dairy, the collection of the bottles themselves consuming considerable time as well as precluding the delivery wagon from being loaded to its full capacity owing to the room which they take up. On the other hand, the paper bottles forming part of the subject-matter of the present case, occupy but little room in the wagon, thereby permitting all available space in the latter to be utilized; their use enables the driver to deliver over a longer route than is ordinarily possible, since each bottle is intended to be used once only and no time is lost in collecting the empty bottles; the bottles are highly sanitary, inasmuch as they are constructed of waterproofed material, and are practically non-refillable; and they are economic in that they can be manufactured at a low cost, are unbreakable, and when once properly sealed, retain their contents until opened without danger of leakage or spilling.

It may be stated, accordingly, that the object of the present invention comprises, briefly, the production of a filled and sealed paper bottle of the type specified, by means of improved apparatus which preferably includes, *inter alia*, filling mechanism and closing and sealing mechanism, and instrumentalities for operating these mechanisms.

Figure 13:
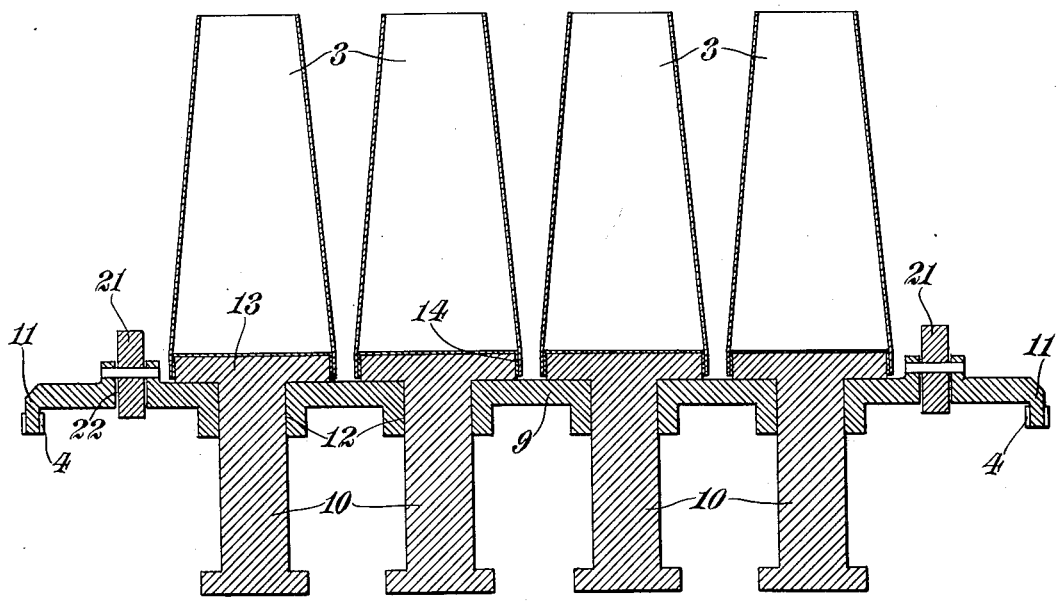
Figure 28:
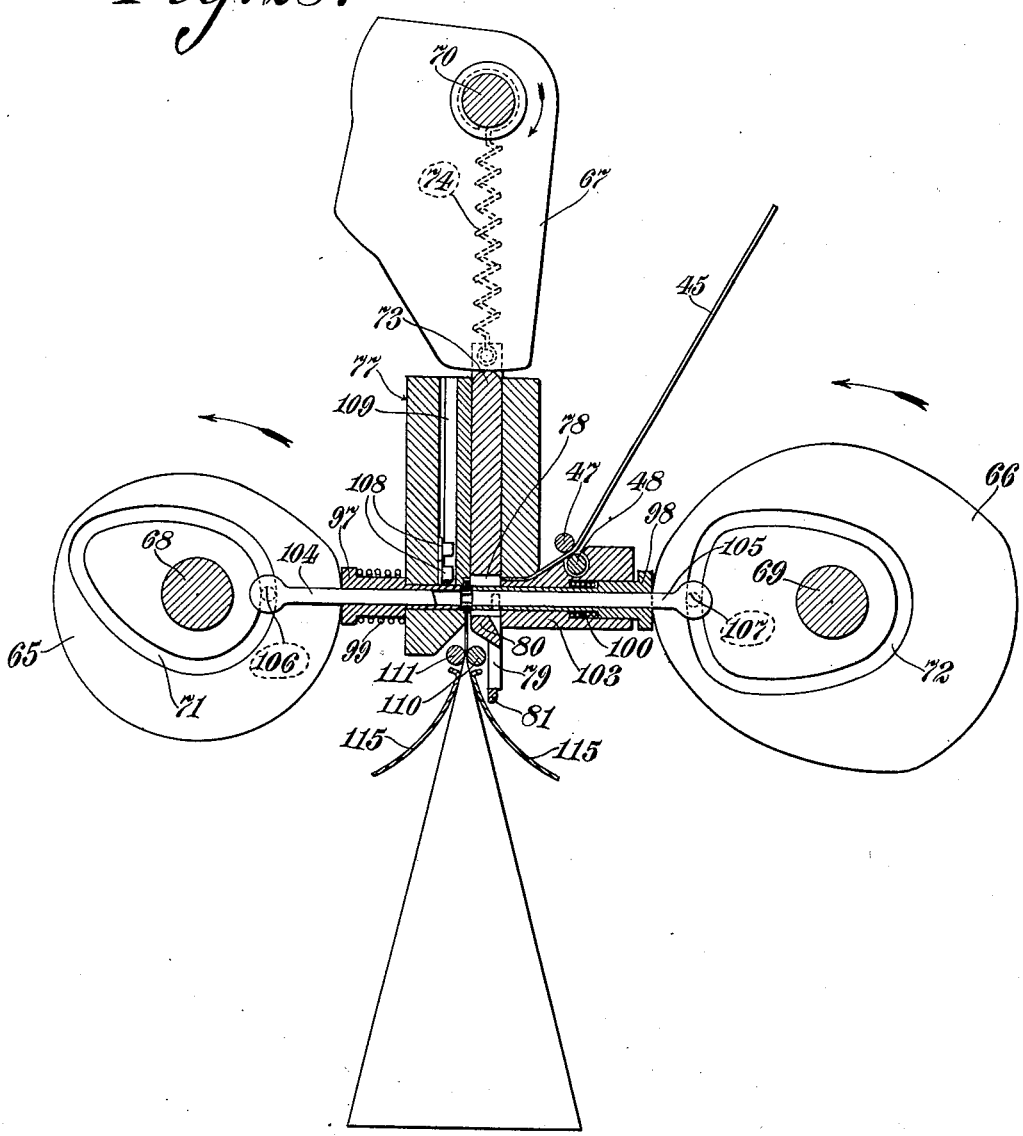
Figure 29:
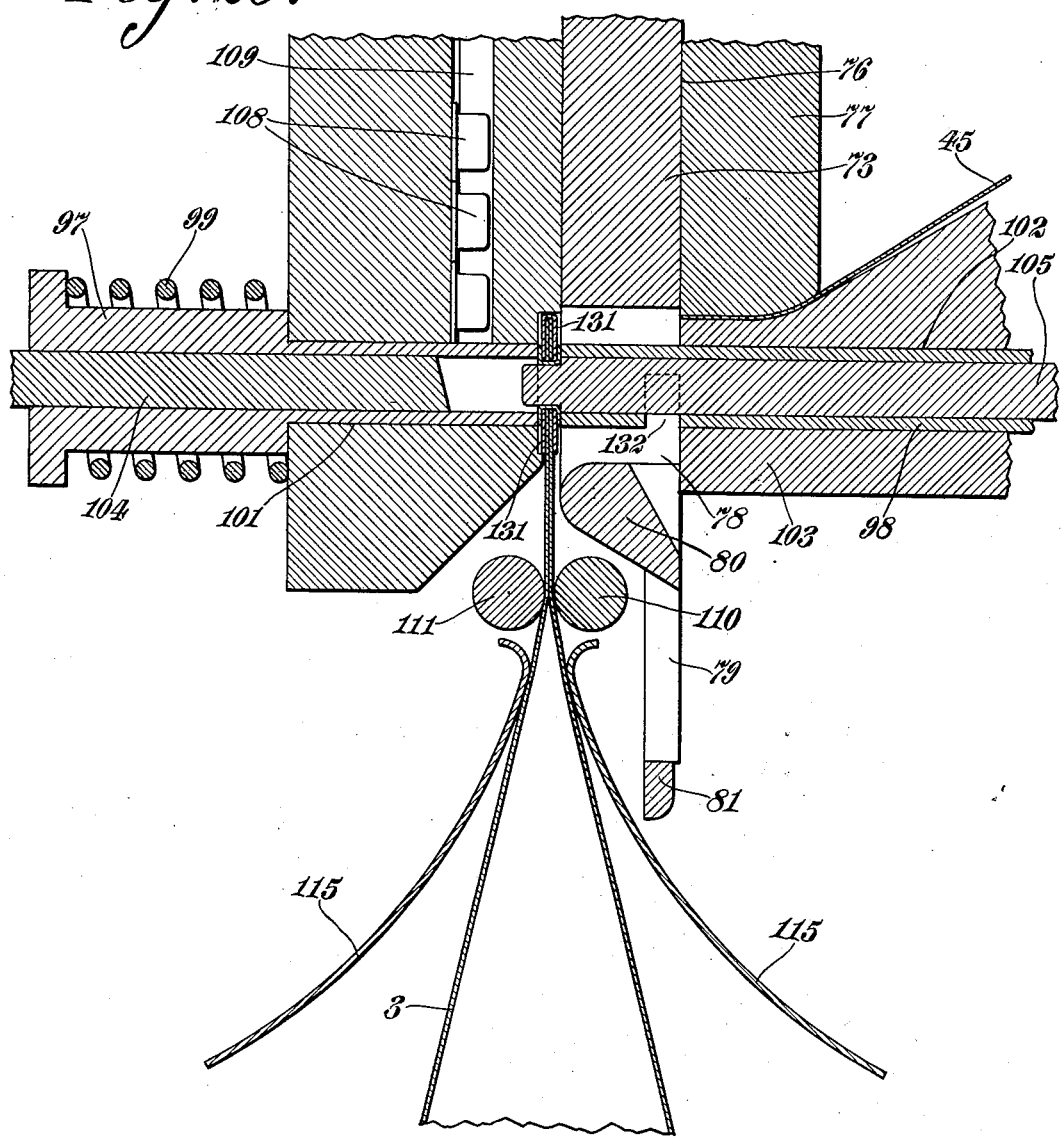
Figure 30:
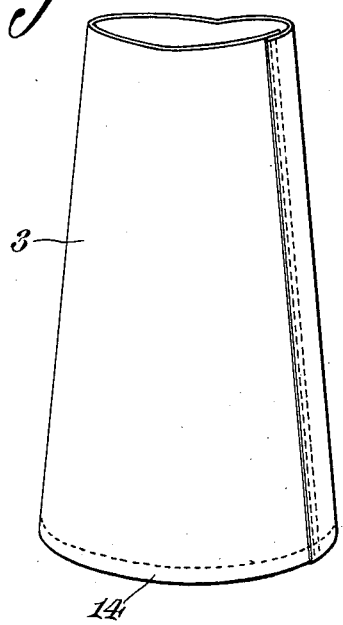
Figure 31:
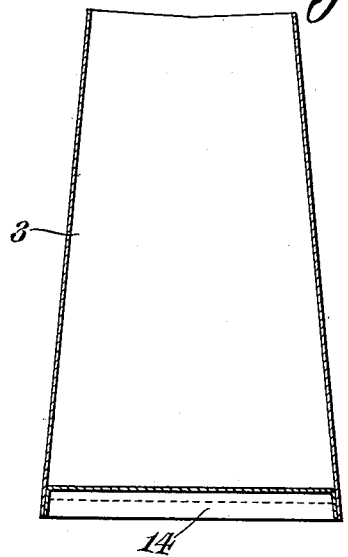
Figure 32:
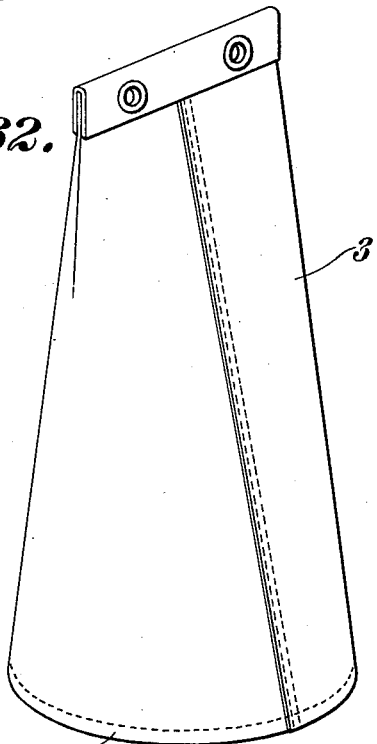

In the accompanying drawings forming part of this specification, in which like numbers of reference denote like parts wherever they occur, Figure 1 is a side elevation of the complete apparatus; Fig. 2 is a front elevation of same; Fig. 3 is an enlarged fragmental plan view of the front part of the apparatus; Fig. 4 is a transverse sectional view of the line 4—4, Fig. 3; Fig. 5 is an enlarged detail view, in side elevation, of the mechanism for actuating the closing and sealing mechanism; Fig. 6 is a transverse sectional view on the line 6—6, Fig. 5; Fig. 7 is a transverse sectional view on the line 7—7, Fig. 6; Fig. 8 is an enlarged detail view of one of the shafts for feeding the metal sealing strip to the aforementioned closing and sealing mechanism, and the parts directly associated with that shaft; Fig. 9 is a face view of the device for preventing reverse rotation of said shaft; Fig. 10 is a fragmental detail view of the devices for driving the feeding shaft; Fig. 11 is a transverse sectional view on the line 11—11, Fig. 8; Fig. 12 is an enlarged plan view of a series of bottle-holders and the carrier for same; Fig. 13 is a longitudinal sectional view on the line 13—13, Fig. 12, the bottles appearing in vertical section; Fig. 14 is an enlarged vertical sectional view of the liquid reservoir and its associated valves, one of the bottles being shown in elevation thereunderneath, in position to be filled; Fig. 15 is a detail face view of the device for centering the bottle carriers with reference to the bottle-raising mechanism; Fig. 16 is a side elevation of said centering device; Fig. 17 is a perspective view of one of the metal bending and cutting devices comprehended in the closing and sealing mechanism; Fig. 18 is a perspective view of one of the two guides which are likewise included in the aforementioned mechanism; Fig. 19 is a similar view of the other guide; Fig. 20 is a plan view of the combined guide and presser device for acting on the bottles after the same have been raised; Fig. 21 is a side elevation of Fig. 20; Figs. 22 to 28 are detail sectional views on the line A—A, Fig. 4, depicting the working parts of the closing and sealing mechanism in the various positions which they successively assume during operation; Fig. 29 is an enlarged fragmental detail of Fig. 28, depicting the final position of said parts before returning to their initial position; Fig. 30 is a perspective view of the bottle in the condition in which it is delivered to the apparatus; Fig. 31 is a longitudinal sectional view of said bottle; and Fig. 32 is a perspective view of the bottle after having been completely closed and sealed during the passage through the apparatus.

The apparatus shown in the drawings consists, essentially, of a suitable frame, base, or support 1, whereon the several mechanisms, devices, and instrumentalities hereinafter described are mounted, and a conveyer 2 for carrying the bottles 3 through the apparatus. This conveyer, in the present instance, is constituted by a pair of endless chains 4, which connect front and rear pairs of sprocket-wheels 5 and 6 secured to shafts 7 and 8 journaled and supported in frame 1. The chains themselves are connected at suitable intervals by transversely arranged bars 9 that act as carriers for the bottle-holders 10, depicted in Figs. 12 and 13, the downturned reduced ends 11 of these bars being attached to said chains in any desired manner. Each carrier is adapted to support one or more of the aforesaid holders, which latter are slidably fitted in perforations 12 formed in the carrier. Both ends of the holders are enlarged to limit their sliding movement in opposite directions, the larger upper ends 13 constituting heads upon which the bottles are fitted.

The type of the bottle preferably employed is depicted in Figs. 30 and 31, and, as shown therein, has the shape of an axially elongated truncated cone, the base portion of which is formed with a depending peripheral flange 14 that is designed to encircle the head 13 of a holder, when in place thereon. The bottles are constructed of paper or other sheet material of a like character, which is treated with a waterproofing substance, such, for example, as paraffin. They may be made to contain any desired quantity of milk or other liquid, as will be understood, and may be fitted upon their holders either by hand or by means of suitable mechanism.

To drive the conveyer 2, the following parts are preferably provided: Upon one end of the front shaft 7 there is loosely mounted a handle 15, which is normally held by a spring 16 in contact with a stop-pin 17 secured to the frame of the apparatus. This handle carries a spring-pressed pawl 18 that engages the peripheral edge of a three-toothed ratchet 19 rigidly mounted on shaft 17. When the handle is swung forwardly, its pawl will be brought into engagement with the adjacent ratchet tooth, whereupon continued movement of said handle will effect rotation of said shaft and, in consequence, of the conveyer, such rotation continuing until a projection 20 provided upon the handle strikes against a pin 17. The handle is then released, and returns automatically to its initial position under the influence of spring 16, the conveyer remaining at rest at that time. Pin 17 serves, therefore, to limit both the forward and rearward movement of the handle.

To support the upper stretch of the conveyer when in operation, the several carriers 9 are each preferably provided at opposite ends with rollers 21, which are mounted thereon in any desired manner and project through openings 22 in said carriers, the lower portions of these rollers resting on suitable tracks 23 connected with the frame of the apparatus.

During their travel with the conveyer toward the front of the apparatus, the empty bottles are first brought into position in alinement with the filling mechanism, the driving mechanism for said conveyer hereinabove described being so constructed and arranged that at each actuation of handle 15 a row of bottles is brought into position to be filled, while a second row of bottles, which have been previously filled, are moved into position to be closed and sealed, and a third row is moved from beneath the closing and sealing mechanism into position for removal from the conveyer. The aforementioned filling mechanism, as shown in Figs. 1 and 14, preferably comprises a reservoir 24 adapted to contain a supply of milk or other liquid, the bottom of which reservoir is formed with a series of outlet passages 25 equal in number to the bottles comprised in one of the rows. To said bottom is detachably connected a series of measures 26, each made to hold a pint, quart, or other desired quantity corresponding to the capacity of the bottles to be filled. These measures are, also, provided with outlet passages 27, and vent pipes 26ª, which pipes open into the atmosphere above the reservoir to prevent the formation of a vacuum in said measures. The flow of milk through the passages 25 and 27 is controlled through the agency of separate valve systems constituted, in the present instance, by upper and lower shafts 28 and 29 that are suitably journaled and supported in the bottom portions of said reservoir and measures and are formed, respectively, with series of openings 30 and 31 corresponding in number to said passages and adapted to be brought into and out of registration with the latter, during the rotation of the shafts, as will be understood. To actuate said shafts, they are provided at one end with crank arms 32 and 33 whose reduced terminals are engaged in slots 34 and 35 formed intermediate the ends of a pair of horizontally-disposed operating bars 36 and 37 slidably supported in brackets connected with the frame of the apparatus. These slides are normally forced toward the front of the apparatus by a pair of springs 38 and 39, and their forward ends are adapted to be engaged by the inclined surface 40 of the main operating bar 41, which latter is vertically disposed with respect to the apparatus, is slidably supported and guided in the frame of the apparatus (preferably by the engagement of a pin or pins 42 in a longitudinal slot or slots 43 in said bar, as depicted in Fig. 1), and is normally held in elevated position by a spring 44. It will be apparent, therefore, that when the operating bar 41 is depressed, (either manually or through the intermediary of suitable mechanical devices), its inclined surface 40 will first engage the upper slide 36 and force the latter rearwardly, so as to rock shaft 28 in a counter-clockwise direction, and, as the downward movement of said bar continues, its said surface will engage and shift the lower slide 37 in a similar manner, thereby rocking shaft 29 in a clockwise direction. In practice, the openings 30 and 31 are preferably disposed at right-angles to each other, as depicted in Fig. 14, the upper openings normally alining with passages 25, while the lower openings are normally out of alinement with the passages 27. Consequently, the measures are normally in communication with the reservoir and, hence, remain filled, the above-described movements of the respective slides serving to close such communication and move openings 31 into alinement with passages 27, whereupon the milk will flow from the measures into the bottles therebeneath. When the upward movement of the operating bar takes place, consequent upon its release, and the cam surface 40 thereon passes beyond bar 37, the latter will be free to move forward under the influence of spring 39, thereby rocking shaft 29 counter-clockwise and closing the valves in the measures, and, similarly, when said surface passes beyond bar 36, that bar will also advance through the agency of its spring 38, and will rock shaft 28 clockwise, so as to open the reservoir valves and permit re-filling of the measures. After having thus been filled, the bottles are carried by the conveyer into position to be acted upon by the closing and sealing mechanisms, which mechanisms serve to flatten and close together the mouths of the bottles, bend a strip of thin metal, (preferably sheet tin) over the closed mouths, and fasten said strips securely to said mouths. These mechanisms may advantageously be actuated by means of the operating bar 41, so that such actuation will take place simultaneously with that of the filling mechanism. The tin, indicated by the numeral 45, is wound in the form of continuous strips upon suitably-supported reels 46 and is fed toward the main working parts, hereinafter referred to and described, of the aforesaid closing and sealing mechanism by means of a pair of horizontal shafts 47 and 48, the former of which has two separate rotary movements imparted thereto during each descent of the operating bar 41. This shaft carries on the end which is adjacent to bar 41 a loose gear 49, which is successively engaged by upper and lower series of teeth 50 and 51 formed in spaced relation on one edge of a vertical rack 52 that is connected to said bar, preferably to a depending hook-shaped nose 53 provided upon the upper end of the bar. To one face of gear 49 there is rigidly secured a disk 54 carrying a spring-pressed pawl 55 that co-acts with the single tooth 56 of a ratchet 57 fast on shaft 47, as depicted in Figs. 8, 10, and 11, the opposite end of shaft 47 carrying a ratchet 58 of the ordinary type that is secure thereon and is engaged by a gravity pawl 59, (see Figs. 8 and 9). When the downward movement of rack 52 takes place, consequent upon the descent of the operating bar, its lower teeth will engage the adjacent series of teeth 61 on gear 49 and will turn the latter through one-half of a revolution, the aforesaid teeth 61 being separated from the other series of teeth 62 on said gear by blank or untoothed spaces 63 and 64, as shown in Fig. 10. During this rotation of gear 49, the pawl 55 carried by its disk 54 is engaged with the tooth 56 on ratchet 57, as a result of which shaft 47 will also be moved through a half-revolution, thereby producing an initial feed movement of the tin into the position depicted in Fig. 22. At the termination of the period of rotation referred to, the rack teeth 51 pass below the gear teeth 61, and the left-hand untoothed or blank portion 63 of said gear is brought opposite the rack edge, so that the continued downward movement of the rack produces no further rotation of the tin-feed shaft 47 until the upper series of rack teeth 50 are brought into play, as hereinafter described. Rack 52 is shown in its initial position in Fig. 10, as will be understood. The several treatments to which the tin is subjected, inclusive of its feeding, are preferably effected through the agency of series of cams 65, 66, and 67 secured, respectively, to horizontal shafts 68, 69, and 70, the cams 65 and 66 being provided upon one face with cam grooves 71 and 72. The cams 65 and 66 are arranged in pairs upon their respective shafts, for reasons subsequently set forth, and the number of such pairs is equal to that of the cams 67.

The bending and cutting of each strip of tin is effected by means of a plate-like member 73 depicted in Fig. 17. These members are suspended by pairs of retractile coil springs 74 from shaft 70 and are depressed by the cams 67 thereon against the action of said springs, the peripheries of the cams being received in recesses 75 formed in the upper edge of said members. They are adapted to reciprocate in vertical passages 76 provided in a guide 77 (see Fig. 18), there being a separate passage for each of said members. The members in question are each provided with a pair of transverse apertures 78, and below the same with a transverse slot 79, the upper longitudinal wall of each slot being sharpened and curved and beveled rearwardly to produce the cutter 80. The extreme lower portion 81 of each member is reduced in thickness.

Shaft 70 is adapted to be rocked through the instrumentality, preferably, of a lever 82, best shown in Fig. 5, which is secured thereto at one end and is controlled by a spring 83. The opposite end of this lever lies in the path of nose 53 of the operating bar 41, when the latter is depressed, said nose will engage said lever end and turn or swing the lever into the position indicated in dotted lines in the figure referred to, thereby rocking shaft 70 in a clockwise direction, with resultant action of the cam. The aforesaid nose 53 is, also, designed to engage the upper end of an arm 84 loosely mounted intermediate its ends on a horizontal shaft 85 supported by bracket 85ª and arranged between and parallel to the shafts 68 and 69, so as to turn or swing said arm in a clockwise direction. This arm is provided adjacent to its upper end with a pin 86 on which is pivoted a spring-pressed pawl 87 that engages the teeth 88 of a ratchet 89, which is rigidly secured to one face of a gear 90, also, loosely mounted on shaft 85, said gear meshing with the gears 91 and 92 fast on the cam shafts 68 and 69 (see Figs. 5 and 7). The gears 90, 91, and 92 are so proportioned that the last two gears each make a complete revolution during one-third of a revolution of the first gear, the teeth 88 on ratchet 89 being three in number, as shown. To prevent over-running of gear 90 at each partial rotation thereof, a plate 93, or other suitable device may be employed, said plate being shown, in the present instance, as loosely pivoted at one end to shaft 69 and as formed at its opposite end with an offset hook 94, which normally rests upon pin 86, at which time it is supported above the path of movement of a series of three lateral pins 95 secured to said gear. When the gear mentioned is partially rotated consequent upon the swinging of arm 84, due to the depression of the operating bar 41, as above described, the hook 94 will be disengaged from its supporting pin 86 and will be free to drop into position for engagement by the approaching gear pin 95, thus terminating the rotation of said gear. Arm 84 is returned to its initial position after each actuation through the action of a suitable spring 96, being limited in such movement by the engagement of its finger 84ª with shaft 68.

The punching operation, a portion of the bending operation, and the feed, insertion and securing of the fastening devices are effected through the agency of the cams 65 and 66 and their grooves 71 and 72. The peripheral edges of said cams operatively engage the enlarged outer portions of hollow plungers 97 and 98, which are, respectively, controlled by springs 99 and 100. These plungers are likewise arranged in pairs and their reduced inner portions reciprocate in horizontal passages 101 and 102 that are formed through the guide 77 and through a second guide 103, a portion of the latter guide being arranged directly below the first-mentioned guide. The inner ends of said plungers are arranged in alinement with each other. Each plunger of one series has movable within its interior a punch rod 104, and each plunger of the other series is provided with a similarly-arranged die rod 105, the aforesaid punches being operatively connected with the respective cam grooves 71, and the die rods with the cam grooves 72, by means of pins 106 and 107 with which their outer ends are provided.

The fastening devices 108 employed are preferably in the form of eyelets or rivets which are loaded in vertical, open-ended magazines or chutes 109 in the main guide 77, these chutes being arranged in pairs, as will be surmised, so as to have a pair of rivets to be attached to each bottle mouth. The lower ends of the chutes open into the passages 101, but are normally closed by the ends of the plungers 97.

In connection with the parts above described, there are provided devices or instrumentalities for closing the mouths of the bottles, when the latter are brought to a position beneath the closing and sealing mechanisms and prior to the application of the sealing strip, for raising the bottles into position to permit them to be operated upon by the said mechanisms and the closing device, and for centering the bottles with reference to the elevating device. The first of these devices, which is illustrated in Figs. 20 and 21, consists preferably of fixed and movable horizontal rollers 111 and 110 supported in parallel relation in the frame 1, the movable roller 110 having its ends disposed in slots 113 therein and being normally forced toward the fixed roller by springs 114. The bottles, on being raised by the hereinafter described elevating device, are directed toward said rollers by means of a pair of opposed guides 115 located directly beneath the rollers.

The above-mentioned elevating device consists, in the present instance, of a transversely-arranged horizontal plate 116, which is supported at its ends by a pair of links 117 pivoted to arms 118 carried by a transversely-arranged horizontal rock-shaft 119, journaled in the frame (see Figs. 1 and 4). To operate this shaft same is provided with a third arm 120, which projects in the opposite direction from arms 118 and is secured on the projecting end of said shaft adjacent to the operating bar 41, so as to extend into the path of the lower shoulder 121 formed on said bar. The arrangement is such, therefore, that depression of the bar will serve to rock said shaft, and, in consequence, to elevate plate 116 into contact with the lower ends of the stems of a row of holders, thereby raising the latter and causing them to move the mouths of the bottles thereon between the guides and the closing rollers 110 and 111. The bottles and their holders will be held in elevated position by the engagement of arm 120 with the adjacent face of the operating bar until shoulder 121 has passed beyond said arm 120 during the ascent of the operating bar. Plate 116 is guided during its movements by means of a pair of depending rods 122 secured to tracks 23, these rods projecting through openings 123 in said plate (see Fig. 4).

The devices for centering the holder carriers in position to permit the elevation of the holders by plate 116 may each advantageously comprise a bell-crank lever 124 pivoted to a lug carried by the frame directly above the adjacent end of said plate, the shorter vertical arm 125 thereof being held against the adjacent frame wall by means of a spring 126, which bears upon the long horizontal arm 127, as depicted in Fig. 16, so as to hold the lever normally in operative position. At its outer end, each lever arm 127 carries a plate 128 formed with an inverted V-shaped notch 129, which extends upwardly from the central portion of its lower edge, said notch being adapted to receive therein the roller 21 on the adjacent end of the carrier. The lower edges of the end portions of plate 128 are inclined or curved downwardly toward the notch as indicated by the numeral 130, so as to raise the plate during the travel of the carrier, the peripheries of the rollers 21 engaging the lower edges of the plates, as shown in Fig. 16.

The operation of the main working parts of the closing and sealing mechanism proper is substantially as follows, and will best be understood from an inspection of Figs. 22 to 28, inclusive: Referring back to the description of the rack bar 52, and the parts directly associated therewith, it will be remembered that the downward movement of this bar initially rotates the tin feed shaft 47 through a half revolution, with a resultant feed of the strips of tin through the space between the guides 77 and 103 into and across the passages 76 in the former guide and below the lower edges of the reduced portions 81 of the combined bending and cutting members 73, which latter are then (initially) in their highest position, as shown in Fig. 22. In describing the further positions successively occupied by the several sets of these parts, reference will be had to one set only, as all of the sets operate in identically the same manner. As the downward movement of the rack bar is continued, the active tin feed shaft is idle, but the shaft 70 carrying the cams 67 for operating the aforesaid members 73 is rocked through the instrumentality of lever 82 and nose 53. Member 73 moves downward in its passage into the position shown in Fig. 23, its reduced portion 81 bending the projecting end of the tin backwardly and downwardly against the open inner ends of the corresponding pairs of passages 102. At about the time that this bending step has been completed, the upper rack teeth 50 engage the teeth 62 in the feed gear, and effect a second feed movement of the strip, the previously bent end of which moves across passage 76 through the slot 79 in member 73, which is then at rest, and seats itself in a recess 131 in the far wall of said passage, (see Figs. 24 and 29). During this period, the bottles are raised by the elevating devices into the position shown in Fig. 24, their mouths being flattened and forced or squeezed shut by the action of the rollers 110 and 111 which constitute the closing device. Further rotation of shaft 70 continues the downward movement of member 73, with the result that that portion of the tin which projects across passage 76 is severed by blade 80 and is forced by the same against the adjacent face of the flattened bottle mouth, thereby closing it. This position of the parts is depicted in Fig. 25. At this time, nose 53 will have passed beyond the end of lever 82, and said lever will be engaged by the side edge of the nose, the member 73 thus being held in the position shown in Fig. 25, with its perforations 78 registering with the passages 101 in guide 77. Lever 82 is depicted in dotted lines in this position in Fig. 5. Nose 53 then moves into contact with the upper end of the lever 84, and rocks the latter, whereupon the gears 90, 91, and 92 will be caused to rotate, affecting, in consequence, simultaneous rotation of the cam shafts 68 and 69. During the revolution of said shafts, the cams 65 and 66 thereon will turn into the positions depicted in Fig. 26, and as this takes place plunger 98 will be forced inwardly so as to engage the adjacent folded portion or leaf of the tin sealing strip and to act as a brace for the same during the inward or operative movement of the punch 104 effected by the cam groove 71. The pieces of tin and paper cut from the mouth of the bottle by the action of the punch fall out through an opening 132 formed in the hollow plunger 98 and thence through the space behind blade 80 out of the apparatus. As the above-mentioned cams move through their succeeding partial revolution, they gradually assume the position shown in Fig. 27, both plungers 97 and 98 moving backwardly under the influence of their controlling springs. This movement of the plunger 97 opens communication between the rivet chute 109 and the corresponding passage 101, thus permitting a rivet to drop into the latter from the former. During the continued movement of the cams, both the plunger 97 and the die 105 are moved inwardly into the positions shown in Figs. 28 and 29, at which time said plunger forces the rivet into the previously cut opening therefor, while the die serves to spread the rivet sufficiently to cause it to project into the path of movement of the plunger 98, which latter, also, is moved inwardly at the same time. Further rotation to the cams will restore the plungers, punch, and die to their respective initial positions. Pressure upon the operating bar is then released, whereupon said bar will ascend automatically through the agency of its controlling spring 44, and, in so doing, permits levers 82 and 84 likewise to assume their normal positions. During the return movement of lever 82, shaft 70 will be rocked counter-clockwise, and will, in consequence, return the actuating cam 67 for the combined bending and cutting member to normal position. The return movement of lever 84 will, however, have no effect upon gear 90, since its pawl 87 will ride idly along the periphery of ratchet 89.

The operation of the entire apparatus is believed to be apparent from the foregoing and to require no further description.

I claim:

1. In an apparatus for treating paper bottles, the combination, with valve-controlled bottle-filling mechanism, and a slide for actuating the controlling valve, of a depressible bar having a cam surface adapted to engage one end of said slide when said bar is depressed for actuating the slide, mechanism for closing the mouth of the bottle, mechanism for sealing the closed mouth, and means provided upon said bar for operating said closing mechanism and said sealing mechanism.

2. In an apparatus of the character specified, the combination of bottle-filling mechanism, bottle-closing and sealing mechanisms, and a depressible bar having means thereon for operating all of said mechanisms.

3. In an apparatus of the character specified, the combination of bottle-filling mechanism, bottle-closing and sealing mechanisms, and a depressible bar having means thereon for operating all of said mechanisms during a single downward movement.

4. In an apparatus of the character specified, the combination of bottle-filling mechanism, bottle-closing and sealing mechanisms, and a depressible bar having a cam for operating said filling mechanism and a nose for operating said closing and sealing mechanisms.

5. In an apparatus of the character specified, the combination of bottle-filling mechanism, bottle-closing and sealing mechanisms, and a depressible bar having a projection for operating said filling mechanism and a second projection for operating said closing and sealing mechanisms.

In testimony whereof I hereunto affix my signature in the presence of two witnesses.

JOHN L. ZEILER.

Witnesses:
O. C. GOODIN,
C. A. RYAN.